United States Patent
Talluru et al.

(10) Patent No.: US 10,514,921 B2
(45) Date of Patent: Dec. 24, 2019

(54) FAST REUSE OF PHYSICAL REGISTER NAMES

(71) Applicant: QUALCOMM Incorporated, San Diego, CA (US)

(72) Inventors: Tejaswi Talluru, Cary, NC (US); Rodney Smith, Raleigh, NC (US); Yusuf Cagatay Tekmen, Raleigh, NC (US); Kiran Seth, Raleigh, NC (US); Daniel Higdon, Durham, NC (US); Jeffery Michael Schottmiller, Raleigh, NC (US); Andrew Irwin, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 90 days.

(21) Appl. No.: 15/695,710

(22) Filed: Sep. 5, 2017

(65) Prior Publication Data

US 2019/0073218 A1    Mar. 7, 2019

(51) Int. Cl.
*G06F 9/30* (2018.01)
*G06F 9/38* (2018.01)

(52) U.S. Cl.
CPC ............ *G06F 9/3013* (2013.01); *G06F 9/384* (2013.01)

(58) Field of Classification Search
CPC .............................. G06F 9/384; G06F 9/3012
See application file for complete search history.

(56) References Cited

U.S. PATENT DOCUMENTS

| | | | |
|---|---|---|---|
| 6,772,317 B2 | 8/2004 | Jourdan et al. | |
| 7,406,587 B1 | 7/2008 | Zhang et al. | |
| 7,506,139 B2 | 3/2009 | Burky et al. | |
| 7,809,930 B2 | 10/2010 | Piry et al. | |
| 9,436,472 B2 | 9/2016 | Zhu et al. | |
| 2002/0184473 A1* | 12/2002 | Gold | G06F 9/30098 712/217 |
| 2006/0090063 A1* | 4/2006 | Theis | G06F 8/4451 712/239 |
| 2012/0005459 A1* | 1/2012 | Fleischman | G06F 9/30032 712/216 |

* cited by examiner

*Primary Examiner* — Zachary K Huson
(74) *Attorney, Agent, or Firm* — Muncy, Geissler, Olds & Lowe, P.C.

(57) ABSTRACT

A method for speeding the re-use of Physical Register Names (PRNs), and hence the processor registers, in a processor. The method involves returning a PRN to a freelist for reuse when it is obsolete even when it is not complete, and blocking writes to the Processor Register File (PRF) by obsolete realms.

12 Claims, 7 Drawing Sheets

Realm 1 Physical Register File Table (PRFT-1)      401

| PRN | Associated With LRN | Current Realm | Realm1 Complete | Realm1 Obsolete | Realm2 Complete | Realm2 Obsolete | RealmN Complete | RealmN Obsolete | PRN Contents |
|---|---|---|---|---|---|---|---|---|---|
| 0 | Null (411) | Null (416) | Yes (420) | Yes (424) | Yes (438) | Yes (440) | Yes (442) | Yes (444) | Value (427) |
| ... | | | | | | | | | Value |
| X | LRN-N | Realm 1 (415) | No (419) | No (423) | Yes (437) | Yes (439) | Yes (441) | Yes (443) | Value |
| ... | | | | | | | | | Value |

FAST REUSE OF PHYSICAL REGISTER NAMES

FIELD OF DISCLOSURE

Disclosed aspects are directed to processing systems. More specifically, exemplary aspects are directed to renaming of registers within a processing system.

BACKGROUND

A processing system may face a variety of challenges in delivering increased performance One prominent challenge is the desire for increasing throughput (i.e., faster program execution).

An access to a local register file is typically faster than a memory access. Therefore, it is desirable to have program data values in accessible registers rather than having to go to memory for each value as it is needed.

A program data value may be operated on by several instructions. To help speed up program execution, modern processors typically operate on several instructions at once. The several instructions may be split up so that they can be executed in parallel by placing their data in separate registers. However this can lead to data hazards, as the same program data values are written to and read from multiple registers all representing the same program data value. This type of hazard could be eliminated simply by delaying any write to a data value in the processor's registers until after all the reads have been completed. Alternatively, two copies of the data value can be maintained, an older and a newer value, and reads that precede a write (in program order) can be provided with the older value, while reads that succeed the write can be given the newer data value. This is the basic concept behind register renaming.

Registers are a physical finite resource in a processor. Additionally one data value can be present simultaneously in several registers. Because a single data value can occupy several register locations, reducing the cycle time when the registers can be reused is an important design consideration. Reducing the cycle time requirement can lower the requirement for more registers and therefore improve system processor performance.

Modern processors use register renaming to remove false data dependencies between instructions and to create Instruction Level Parallelism (ILP), resulting in increased performance Since Instruction Level Parallelism (ILP) measures how many operations can be performed simultaneously, the greater the ILP the more instructions can be executed per unit time.

Register renaming involves mapping a Logical Register Name (LRN) to a Physical Register Name (PRN). The PRN is typically picked from a fixed pool and returned to the pool when the value contained in the PRN is no longer needed. PRNs are indexes to a physical register file that holds the data values used for computation. Large register files can be expensive in terms of area and power. While having an increased pool of PRNs is the straightforward way of achieving more ILP, this approach could significantly increase silicon area and power consumption, as well as reduce maximum clock frequency. Accordingly, faster reuse of the available PRNs would commonly result in increased performance, without having the costs associated with a larger PRN pool.

SUMMARY

Exemplary aspects of the invention are directed to systems and method for the reuse of processor registers. The method comprises obsolete detection circuitry for determining that a Physical Register Name (PRN) is obsolete, and freelist addition circuitry for returning a register represented by the PRN to a freelist.

A further aspect of the invention includes a method for reuse of processor registers. The method comprises determining that an instruction calls for writing to a Logical Register Name (LRN), testing to see if the instruction is obsolete; and if the instruction is obsolete returning a Processor Register Name (PRN) associated with the LRN to a freelist.

An additional aspect of the invention includes an apparatus for reuse of processor registers. The apparatus comprises circuitry configured to determine that a Processor Register Name (PRN) is obsolete, and obsolete detection circuitry for circuitry configured to return a register represented by the obsolete PRN to a freelist.

An other aspect of the the current invention includes an apparatus for reuse of processor registers. The apparatus comprises circuitry configured to determine that an instruction calls for writing to a Logical Register Name (LRN); and circuitry configured to determine if the instruction is obsolete return a Physical Register Name (PRN) associated with the LRN to a freelist.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects. Alternate aspects may be devised without departing from the scope of the inventive concepts herein. Additionally, well-known elements of the environment may not be described in detail or may be omitted so as not to obscure the relevant details of the inventive teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
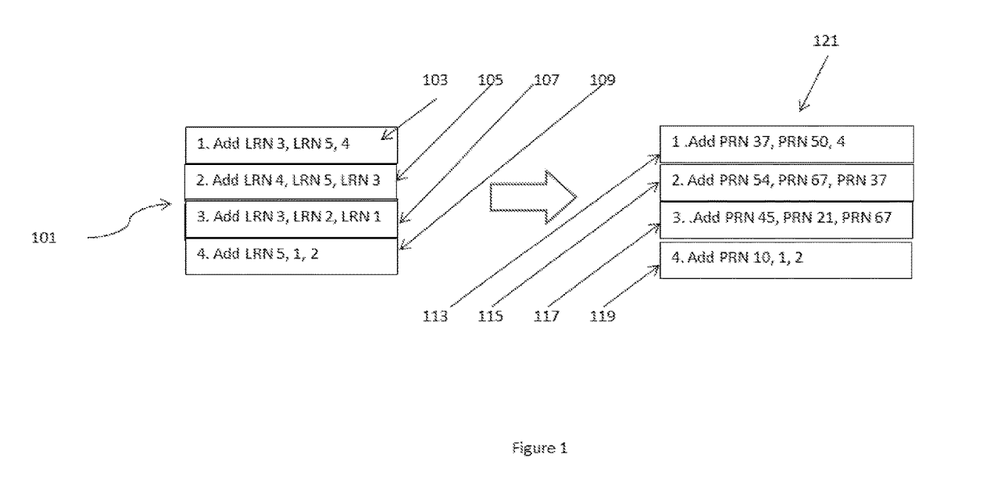
FIG. 1 is a graphical illustration of register renaming.

FIG. 1 is a graphical illustration of register renaming. Register renaming can eliminate false data dependencies such as Write after Write (WAW) in which a value is written over erroneously by an out of sequence write, and Write after Read (WAR) in which a value was written late and a read occurred before its value was written.

In FIG. 1 a sequence of four instructions, 103, 105, 107, and 109 and are illustrated. In the instruction sequence 101, the values LRN 1, LRN 2, LRN 3, LRN 4 and LRN 5 represent logical registers and will be referred to as Logical Register Names (LRN). LRNs represent program variables. Such LRNs typically are translated into physical registers for computation in a processor.

The format of an add instruction 100 illustrated in FIG. 1.—The instruction 100 (e.g. ADD, R3, R5, 4), has a format ADD Result, Operand 1, Operand 2. The result and operands are assigned Logical Register Names LRUs. As seen at instruction 103. Accordingly instruction 103 takes the value 4 (Operand 2) and adds it to the value of LRN 5 (Operand 1), then places the resulting value in LRN 3 (result).

Ideally all the instructions in instructions sequence 101 could be executed in parallel to speed execution. However instruction 105 depends on the result from instruction 103 so instruction 103 will be executed first and will provide a value in LRN 3 for instruction 105.

Instruction 107 also writes to LRN 3 as dose instruction 103. Instruction 107 takes the value in LRN 1 and adds it to the value in LRN 2 and places the result in LRN 3. Accordingly if the instructions in instructions sequence 101 were executed independently, instruction 107 might execute before instruction 103 and then an incorrect value in LRN 3 might be used in instruction 105. Instruction 105 might use the LRN 3 result from instruction 107 instead of the LRN 3 result from instruction 103.

In order to eliminate such dependencies, when the instructions in instructions sequence 101 are translated to use Physical Register Names (PRN) instead of Logical Register Names (LRN), the result is as seen in the list of instructions 121 where the LRN 3 in instruction 103 is translated into PRN 37 in instruction 113, and LRN 3 in instruction 107 is translated into PRN 45.

The list of instructions in instructions sequence 101 is translated into the list of instructions 121 in which the Logical Register Names (LRNs) are translated into Physical Register Names (PRNs) accordingly, instruction 113 has been translated to ADD PRN 37, PRN 50, 4 which means add 4 to the contents of PRN 50, and store the results into PRN 37. In this instruction, LRN 3 of instruction 103 is translated into PRN 37 in instruction 113, and LRN 5 of instruction 103 is translated into PRN 50 in instruction 113.

Similarly in instruction 105 LRN 4 and LRN 5 of become PRN 54 and PRN 67, respectively, of instruction 115. LRN 3 remains PRN 37 as assigned in instruction 113. Similarly LRN 3, LRN 2 and LRN 1 of instruction 107 are assigned to PRN 45, PRN 21 and PRN 67 respectively, of instruction 117. Note that LRN 3 is given a different PRN 45 in instruction 117 whereas the LRN 3 of instruction 103 had been assigned PRN 37. This assignment prevents the data dependency that would have resulted if instruction 117 was assigned to use PRN 37 instead of PRN 45.

Similarly LRN 5 in instruction 109 is assigned PRN 10 in instruction 119 instead of PRN 50 as in instruction 113. This eliminated the data hazard that would exist if instruction 119 executed before instruction 113 and wrote its result into PRN 50 instead of PRN 10.

Figure 2:
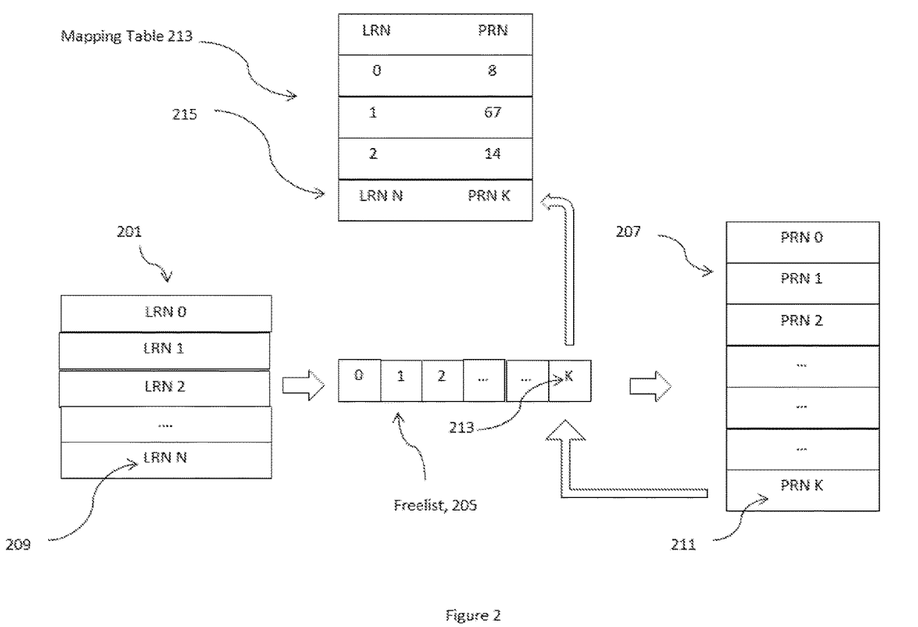
FIG. 2 is a graphical representation of an aspect of a register renaming system.

FIG. 2 is a graphical representation of an aspect of a register renaming system. FIG. 2 illustrates many of the aspects and objects used in register renaming.

Register file 201 represents an Architectural (Logical) Register File containing N+1 logical register names. An Architectural Register File, as an example, may be a list of register names produced by a compiler in the process of compiling a program. Register file 207 represents a Physical Register File (PRF) having K+1 entries.

As an example, when it is time to assign a Physical Register name to LRN N of register file 201, a processor checks a Freelist 205 to find a PRN that is not in use, e.g. entry PRN K 211. Then the processor will remove entry PRN K 211 from the Freelist 205 and assign it to entry LRN N 209. The association between entry LRN N 209 and entry PRN K 211 will be tracked in Mapping Table 213 where Logical Register Name (LRN) N is associated with Physical Register Name (PRN) K, i.e. entry 215. When no instructions are dependent on entry PRN K 211, it may be returned to the Freelist 205. The faster a PRN, e.g. entry PRN K 211, can be returned to the Freelist 205, the quicker the PRN can be re-used and fewer PRNs may be required.

Conventionally a PRN mapped to a LRN is returned to the Freelist 205 only if it is both obsolete and complete. A PRN is obsolete if a younger instruction (later in program order) renames the same LRN to a different PRN and it commits, that is the instruction is guaranteed to execute, or has executed. A PRN is complete when it writes the result value to the Physical Register File (e.g., 207). For example, in FIG. 1, when instruction 117 executes, LRN is remapped from PRN 37 to PRN 45. PRN 37 can be returned to the free list if PRN 37 "completes" and PRN 45 "commits", i.e. PRN 37 is obsolete.

Figure 3:
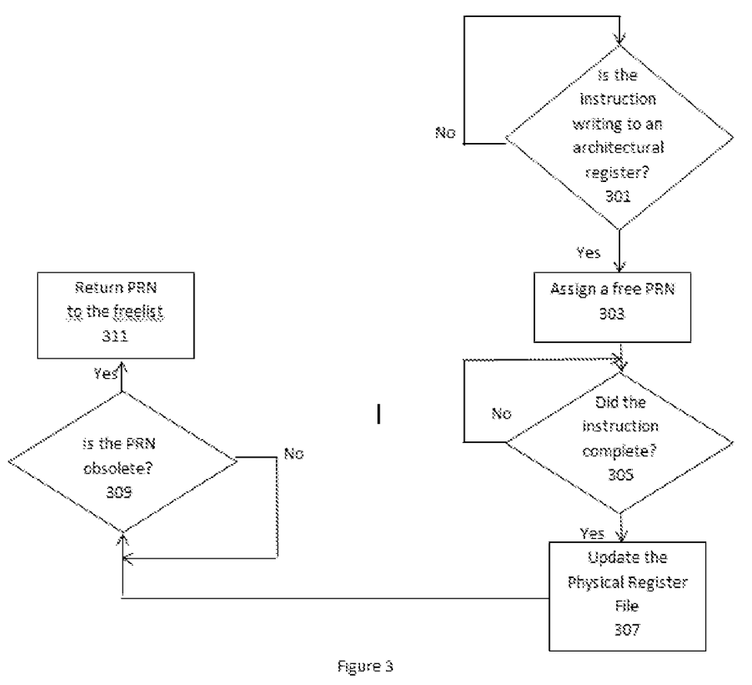
FIG. 3 is a flow chart illustrating a conventional method of assigning and re-using PRNs.

FIG. 3 is a flow chart illustrating a conventional method of assigning and re-using PRNs. In Block 301 an instruction is examined to determine if the instruction will be writing to an architectural register (e.g., an LRN). If the instruction is not writing to an architectural register, control stays with block 301 and the next instruction can be examined. If the instruction will be writing to an architectural register, control passes to block 303 where a free physical register name (PRN) will be assigned to the LRN, and control then passes to block 305. In Block 305 the instruction that had the PRN assigned to it is examined to see if it has completed. If the instruction has not completed then control stays with block 305 until the instruction completes. Once the instruction completes the instruction has no need for the PRN assigned to it, and in block 307 the Physical Register File (PRF) is updated to show the instruction has no longer any need for the PRN, and then control passes to block 309. In Block 309 the PRN is examined to see if it is obsolete, or if other instructions may use the PRN value. If there is a possibility that other instructions may use the PRN value, it is not obsolete and control stays with block 309. If a younger instruction renames the same LRN and is guaranteed to execute, then the PRN is obsolete and control is transferred to block 311, and the PRN is returned to the Freelist (e.g., Freelist 205).

As an illustration consider FIG. 1. When instruction 117 is executed LRN 3 is remapped from PRN 37 to PRN 45, and PRN 37 can be returned to the Freelist 205. PRN 37 can also be returned to the Freelist 205 if PRN 45 commits, i.e. PRN 45 is written to, making PRN 37 obsolete.

Figure 4:
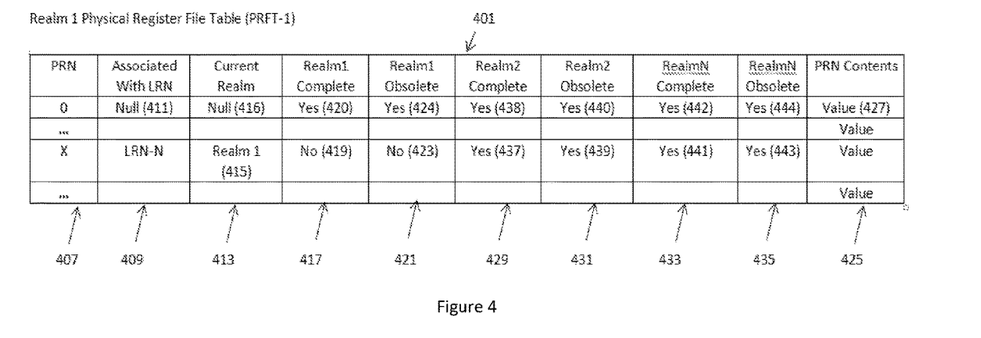
FIG. 4 is a graphical illustration of conceptual Physical Register File Tables (PRFT).

FIG. 4 is a graphical illustration of a conceptual Physical Register File Table (PRFT) 401 that may be used to track PRN status in various realms. Other mechanisms may be used and FIG. 4 is merely an illustration of a conceptualized table method of tracking the status of the PRNs with respect to various realms. The PRFT 401 illustrated is intended to be used as a conceptual illustration of the concepts herein, and an aid in explaining aspects of the inventive concepts and is not to be construed as a necessary structure in the illustrated form. In actual implementations PRFTs may have less or additional information or may exist in an altogether different form altogether. FIG. 4 is a convenient way to illustrate aspects of the teachings herein including the use of realms.

The first column of the PRFT 401, illustrated with respect to PRFT-1, is the Physical Register Name (PRN) 407, the PRN 407 points to an actual physical register within the processing system (e.g., register file 207 of FIG. 2).

The second column of the PRFT 401 represents the Logical Register Name (LRN) 409, associated with the PRN 407, in the same row. If the PRN 407 in the same row is not associated with any LRN 409, then it has a null value, e.g. Null (411). Those PRNs not associated with any LRNs, or those PRNs associated with an LRN but are obsolete in all realms, comprise a "Freelist", which comprise the PRNs available to be assigned to LRNs.

The third column of the PRFT 401 represents the current Realm 413 of the PRN 407 in the same row. The current owner 413 of the PRN 407 is the Realm of the instruction that needs to write or read the value of the PRN 407 that appears in the same row. In the illustration in FIG. 4 PRN X is owned by Realm 1, (415).

Column 417 "Realm 1 Complete" indicates if the instruction associated with the Current Owner, Realm 1, 413 has not completed writing its results 423 to the PRN associated with it in the same row of the PRFT. A No at (419) in the complete column indicates that the PRN contents 425 have not been written by the instruction. A Yes at (419) in the complete column indicates that the PRN contents 425 have been written by the instruction.

Column 421, "Realm 1 Obsolete" indicates any "new" consumers of this LRN will no longer use the previous particular PRN as the LRN is renamed to a different PRN and all existing consumers of this particular PRN have advanced past the point of reading the value associated with this PRN in the register file.

In column 421 the "No" at 423 indicates that not all consumers of the value in PRN X have advanced past the point where they have passed the need to read the contents of PRN X.

Consider PRN 0 in the first row of, PRFT. In the present example PRN 0 is not associated with any LRN hence the value in column 409 is Null 411. Since PRN 0 is unassigned its Current Realm owner is Null (416). In column 417, the column entry representing the completion status are initialized to Yes (420). In the "Obsolete" column 421 the value is initialized Yes (424). In column 425, the PRN contents 427 are arbitrary and of no value as it is associated with nothing.

Similarly the completion status of Realm 2 Complete is initialized as Yes (438) as is the Completion status, in column 433 of Realm N is initialized to Yes (442).

Similarly Realm 2 Obsolete in column 431 is initialized to Yes (440) for PRN 0 and Realm 2 Obsolete is initialized as Yes (439) for PRN X. In Column 435 (Realm N Obsolete) is initialized to Yes (444) with respect to PRN 0 and Yes (443) with respect to PRN X.

Figure 5A:
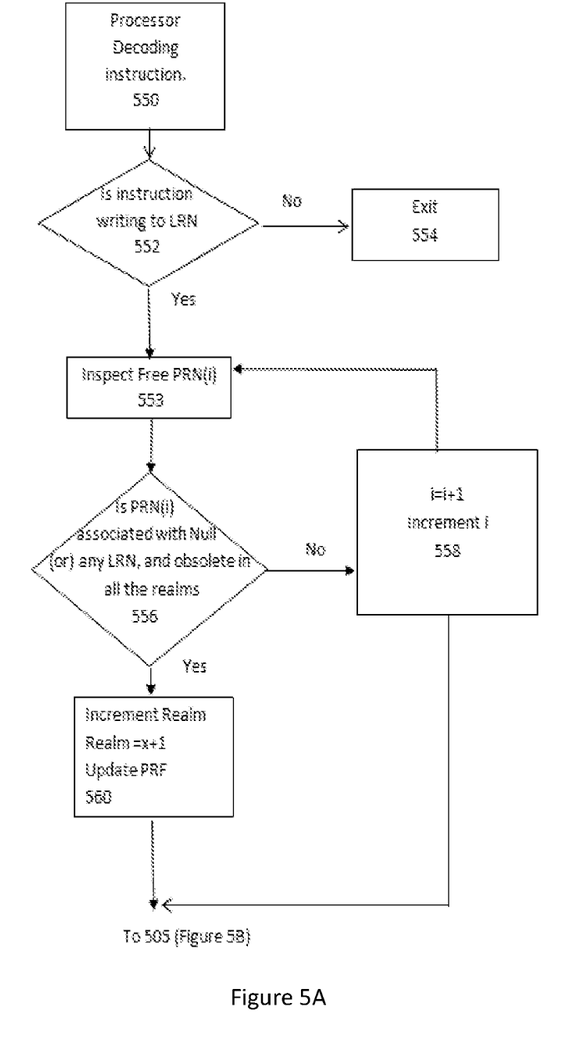
FIG. 5A is a flow chart, according to an aspect of the disclosure.

The status of each PRN within each realm is updated as a program executes to assure that only the current realm may write to its associated PRN. Once the current realm is obsolete the ownership of the PRN associated with that realm may be released and the previous realm may become the current realm and may write to the released PRN. FIG. 5A is a portion of a flow chart, according to an aspect of the invention. In Block 550 a processor is decoding an instruction and control passes to decision block 552. In block 552, the instruction is examined to see if it is writing to a Logical Register Name (LRN). If the instruction is not writing to a LRN, control passes to block 554 and the process ends. If the instruction is writing to an LRN, control passes to block 553 to inspect the Free PRN (i). Then the control passes to block 556 to determine if this PRN is associated with NULL (or) any LRN, and is obsolete in all the realms. The PRFT 401 can be examined to check this. If this particular PRN is not obsolete in any one of the realms, control passes to block 558 and an unused PRN e.g. PRN X is assigned to LRN-N as seen in column 407. Also since the PRN was not associated with any LRN prior to block 558, the instruction is deemed to be in Realm 1 and the current owner of the PRN X is Realm 1. However if block 556 determines that the PRN-X is associated with any LRN and is obsolete in all the realms, then the Realm value 413 in FIG. 4 (in the present example 1) can be incremented (to 2). In this way, multiple LRNs can be using the "same" PRN from different Realms at any given time. PRN-X from Realm 1 will continue to be the owner of the LRN-N.

Figure 5B:
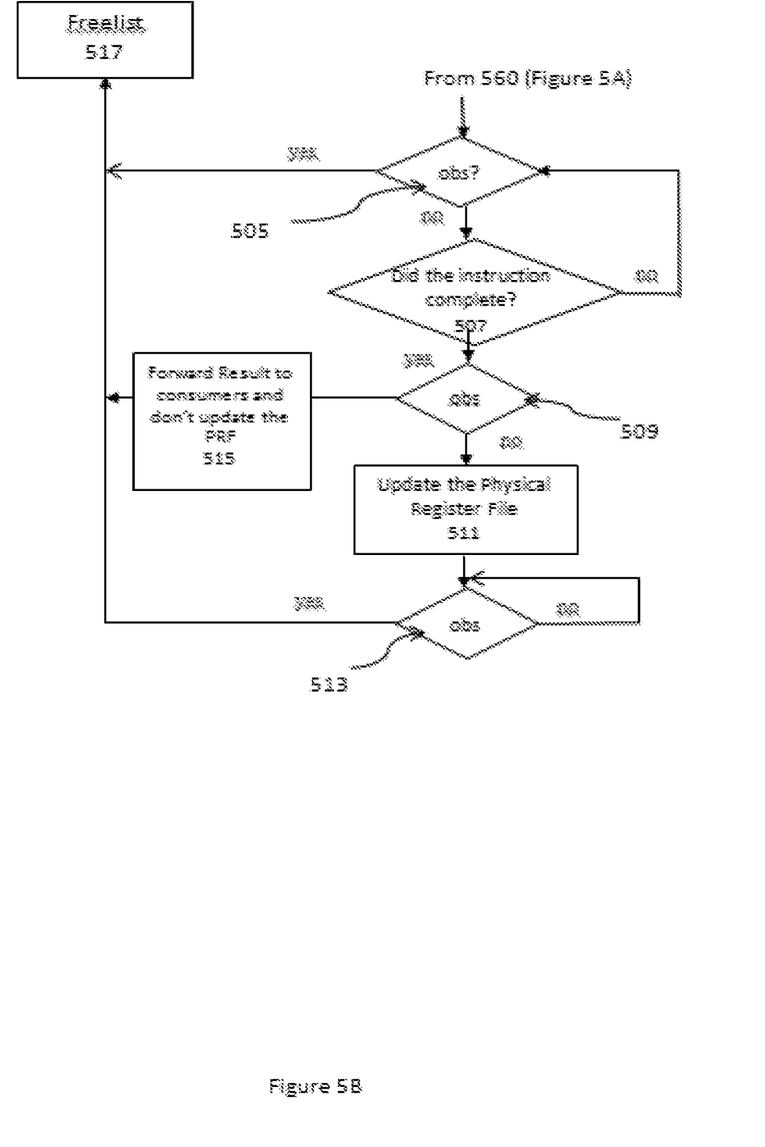
FIG. 5B is a flow chart, continuing the flow chart of FIG. 5A, according to an aspect of the disclosure.

FIG. 5B is a flow chart, according to an aspect of the invention, and is a continuation of the flowchart of FIG. 5A. Control passes to decision block 505 in FIG. 5B from block 560 of FIG. 5A. In decision block 505 the PRN determined in FIG. 5A is examined to see if it is obsolete. If the PRN is not mapped to the same LRN it was associated with in block 556 or 558 then the PRN is obsolete, the PRFT can be updated if necessary, and accordingly control is transferred to block 517 and the PRN assigned in block 556 or 558, in FIG. 5A, may be returned to a Freelist, which is a list of available PRNs as illustrated in FIG. 2 as Freelist 205. If the PRN is not obsolete then control is transferred to block 507 where the instruction is examined to see if it completed, that is it has written its results back to the PRN assigned to the instruction in block 556 or 558. If the instruction did not complete then control is transferred back to block 505. Once the instruction completes control is transferred to decision block 509. In decision block 509 the PRN assigned in in block 556 or 558 is examined to see if it is obsolete. If the PRN is not mapped to the same LRN it was associated with in in block 556 or 558 then the PRN is obsolete, PRN and accordingly control is transferred to block 515 where the value that resulted from the instruction's completion, detected in block 507, is forwarded to other instructions waiting for the result associated with the PRN assigned it in block 556 or 558. Then control is transferred to block 517 where the PRN assigned in block 556 or 558 is transferred to the Freelist 205. If the PRN assigned in in block 556 or 558 is not obsolete control is transferred to block 511 where the value in the Physical Register File (PRF) is updated. Once the PRF is updated in block 511, control is transferred to block 513, where the PRN is examined to see if it is obsolete. If the PRN is not obsolete then control stays with block 513, when the PRN becomes obsolete control passes to block 517 where the LRN assigned in block 556 or 558 is returned to the Freelist 205.

To reuse the PRN faster we can return the PRN to the Freelist when it is obsolete even when it is not complete. To further explain, the term "Realm" is used. Each use of an obsolete and incomplete PRN is termed "Realm." Multiple realms are used since each use of an obsolete and incomplete PRN is a separate Realm. Realms are kept track of in the Physical Register File (PRF). In addition to returning the PRN to the Freelist when it is obsolete even when it is not complete, writes to the PRF value field by obsolete realms are blocked.

Figure 6:
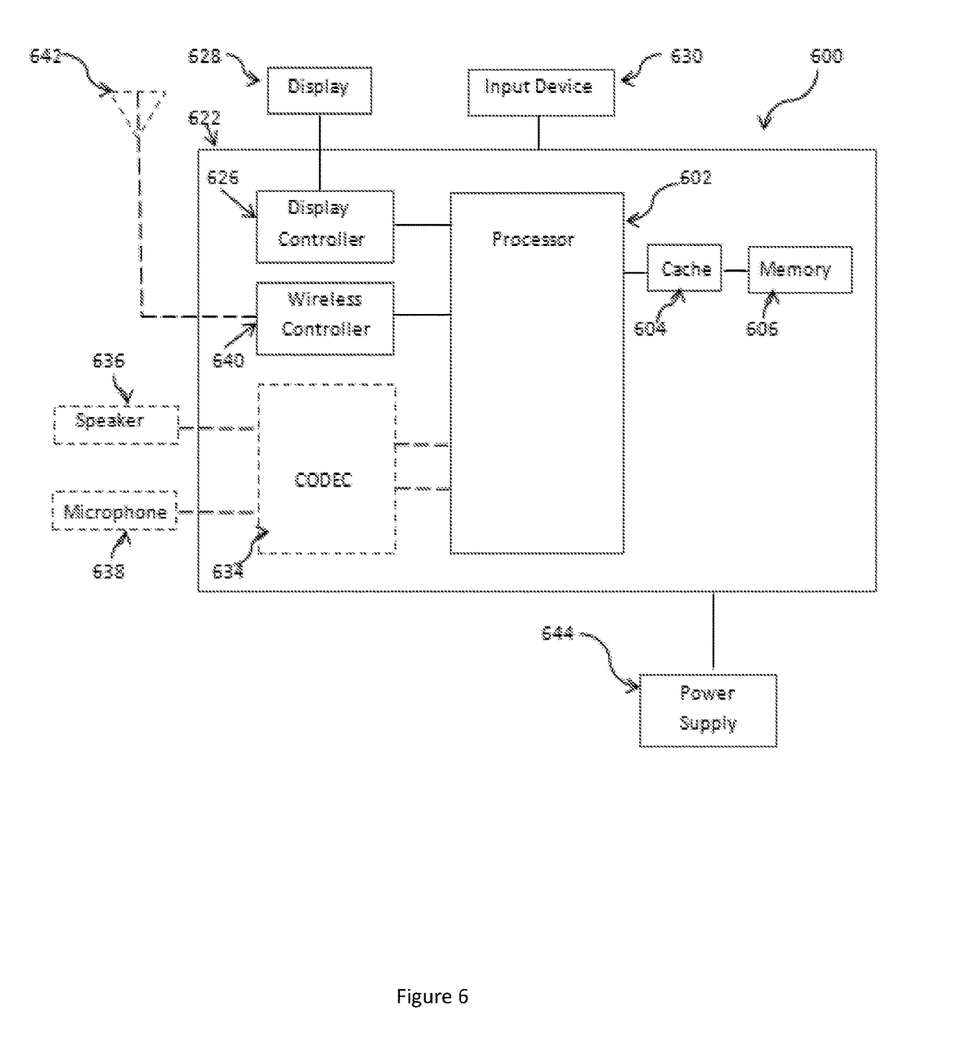
FIG. 6 depicts an exemplary computing device in which an aspect of the disclosure may be advantageously employed.

In FIG. 6, processor 602, which may advantageously employ the teachings herein to improve performance, is exemplarily shown to be coupled to memory 606 with cache 604 between processor 602 and memory 606, but it will be understood that other configurations known in the art may also be supported by computing device 600. FIG. 6 also shows display controller 626 that is coupled to processor 602 and to display 628. In some cases, computing device 600 may be used for wireless communication and FIG. 6 also shows optional blocks in dashed lines, such as coder/decoder (CODEC) 634 (e.g., an audio and/or voice CODEC) coupled to processor 602 and speaker 636 and microphone 638 can be coupled to CODEC 634; and wireless antenna 642 coupled to wireless controller 640 which is coupled to processor 602. Where one or more of these optional blocks are present, in a particular aspect, processor 602, display controller 626, memory 606, and wireless controller 640 are included in a system-in-package or system-on-chip device 622.

Accordingly, a particular aspect, input device 630 and power supply 644 are coupled to the system-on-chip device 622. Moreover, in a particular aspect, as illustrated in FIG. 6, where one or more optional blocks are present, display 628, input device 630, speaker 636, microphone 638, wireless antenna 642, and power supply 644 are external to the system-on-chip device 622. However, each of display 628, input device 630, speaker 636, microphone 638, wireless antenna 642, and power supply 644 can be coupled to a component of the system-on-chip device 622, such as an interface or a controller.

It should be noted that although FIG. 6 generally depicts a computing device, processor 602, cache 604 and memory 606, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for managing allocation of a cache. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method for reuse of processor registers, the method comprising:
   determining that a Physical Register Name (PRN) is obsolete by
      determining an instruction that will write to a register having a Logical Register Name (LRN);
      determining a first Physical Register Name (PRN) associated with the LRN;
      determining that a younger instruction, in program order, renames the LRN by associating the LRN to a PRN different than the first PRN; and
      determining that the younger instruction commits thereby determining that the first PRN is obsolete; and
   returning the obsolete first PRN to a freelist.

2. The method of claim 1 further comprising:
blocking writes to a Physical Register File (PRF) by obsolete realms.

3. The method of claim 1 further comprising:
determining the instruction completed;
determining the instruction is obsolete;
forwarding a result of the instruction to consumers of the result and not updating a Physical Register File (PRF); and
returning the obsolete PRN associated with the LRN to the freelist.

4. The method of claim 3 further comprising:
determining the instruction has completed and determining the instruction is not obsolete;
updating the PRF with the result from a realm associated with the instruction;
testing the instruction until it becomes obsolete; and
then returning the PRN to the freelist.

5. An apparatus for reuse of processor registers, the apparatus comprising:
circuitry for determining an instruction that will write to a register having a Logical Register Name (LRN);
circuitry for determining a first Physical Register Name (PRN) associated with the LRN;
circuitry for determining that a younger instruction, in program order, renames the LRN by associating the LRN to a PRN different than the first PRN; and
circuitry determining that the younger instruction commits thereby determining that the first PRN is obsolete; and
freelist addition circuitry configured to return a register represented by the obsolete first PRN to a freelist.

6. The apparatus of claim 5 further comprising:
circuitry configured to block writes to a Processor Register File (PRF) by obsolete realms.

7. The apparatus of claim 5 further comprising circuitry configured to:
determine the instruction is not obsolete and has completed; and updating a Physical Register File (PRF) with the result from a realm associated with the instruction;
circuitry to test the instruction until it becomes obsolete; and
circuitry configured to return the PRN to the freelist when the instruction becomes obsolete.

8. An apparatus for reuse of processor registers, the apparatus comprising:
means for determining an instruction that will write to a register having a Logical Register Name (LRN);
means for determining a first Physical Register Name (PRN) associated with the LRN;
means for determining that a younger instruction, in program order, renames the LRN by associating the LRN to a PRN different than the first PRN; and
means for determining that the younger instruction commits thereby determining that the first PRN is obsolete; and
means for returning a register represented by the PRN to a freelist.

9. The method of claim 8 further comprising:
means for blocking writes to a PRF by obsolete realms.

10. A method for reuse of processor registers, the method comprising:
means for determining that an instruction calls for writing to a Logical Register Name (LRN);
means for determining the instruction is obsolete; and
means for returning a Processor Register Name (PRN) associated with the LRN to a freelist.

11. The apparatus of claim 10 further comprising:
means for determining the instruction completed;
means for determining if the instruction is obsolete;
means for forwarding a result of the instruction to consumers of the result and not updating a Physical Register File (PRF); and
means for returning the PRN associated with the LRN to the freelist.

12. The apparatus of claim 11 further comprising:
means for determining if the instruction is not obsolete;
means for updating the PRF with the result from a realm associated with the instruction;
means for testing the instruction until it becomes obsolete; and
means for returning the obsolete PRN to the freelist.

* * * * *